United States Patent [19]

Hager

[11] Patent Number: 5,171,759
[45] Date of Patent: Dec. 15, 1992

[54] POLYMER POLYOL COMPOSITIONS AND THEIR USE IN THE PREPARATION OF POLYURETHANE FOAMS

[75] Inventor: Stanley L. Hager, Crosslanes, W. Va.

[73] Assignee: Arco Chemical Technology, L.P., Wilmington, Del.

[21] Appl. No.: 576,984

[22] Filed: Sep. 4, 1990

Related U.S. Application Data

[60] Division of Ser. No. 486,916, Mar. 1, 1990, Pat. No. 5,011,908, which is a continuation of Ser. No. 217,645, Jul. 12, 1988, abandoned.

[51] Int. Cl.$^5$ .................. C08G 18/48; C08G 18/62; C08J 9/08
[52] U.S. Cl. ................................ 521/174; 521/176
[58] Field of Search ........................... 521/174, 176

[56] References Cited

U.S. PATENT DOCUMENTS

| | | | |
|---|---|---|---|
| 3,383,351 | 2/1968 | Stamberger | 524/762 |
| 3,857,800 | 12/1974 | Fishbein et al. | 521/174 |
| 4,089,835 | 5/1978 | Konig et al. | 524/100 |
| 4,111,865 | 9/1978 | Seefried et al. | 521/137 |
| 4,125,505 | 11/1978 | Critchfield et al. | 524/377 |
| 4,226,756 | 10/1980 | Critchfield et al. | 524/388 |
| 4,305,857 | 12/1981 | Reischl | 524/762 |
| 4,305,858 | 12/1981 | Reischl | 524/762 |
| 4,477,602 | 10/1984 | Liang et al. | 521/137 |
| 4,495,341 | 1/1985 | Stamburger | 528/110 |
| 4,497,913 | 2/1985 | Raes et al. | 521/137 |
| 4,544,678 | 10/1985 | Fesman | 521/107 |
| 4,652,589 | 3/1987 | Aimroth et al. | 521/137 |
| 4,659,772 | 4/1987 | Hoy et al. | 524/755 |
| 4,668,734 | 5/1987 | Dietrich et al. | 524/714 |
| 4,701,474 | 10/1987 | Bailey, Jr. et al. | 521/137 |
| 5,001,167 | 3/1991 | Wiltz, Jr. et al. | 521/174 |
| 5,063,253 | 11/1991 | Gansen et al. | 521/174 |

FOREIGN PATENT DOCUMENTS

| | | |
|---|---|---|
| 57-133112 | 8/1982 | Japan . |
| 57-195113 | 10/1982 | Japan . |
| 57-195725 | 12/1982 | Japan . |
| 59-100125 | 6/1984 | Japan . |
| 1339442 | 12/1973 | United Kingdom . |
| 1480972 | 7/1977 | United Kingdom . |

OTHER PUBLICATIONS

Lee and Neville; *Handbook of Epoxy Resins;* McGraw-Hill, Inc. 1967, pp. 12-7, 16-13.
*Epoxy Resin Formulators Training Manual;* SPI, Inc. 1984, p. 320.

*Primary Examiner*—John Kight, III
*Assistant Examiner*—Rabon Sergent
*Attorney, Agent, or Firm*—Dennis M. Kozak

[57] ABSTRACT

Polymer polyol compositions are provided which are useful for the production of flexible polyurethane foams. The polymer polyol compositions are composed of (1) a high functionality polyol, (2) a subsidiary polyalkylene oxide high in polyoxyethylene content and (3) a stably dispersed polymer. The latter component is formed by in situ polymerization of low molecular weight compounds within components (1) and/or (2) used in making the polymer polyol composition. The polymer polyol compositions provide stable and non-shrinking, free-rise foam at high water levels and over a wider crosslinker and index range permitting increased density and load latitude relative to commercial high resilience polymer polyols. A process for their use and foams and articles prepared therefrom are also provided.

10 Claims, No Drawings

POLYMER POLYOL COMPOSITIONS AND THEIR USE IN THE PREPARATION OF POLYURETHANE FOAMS

This application is a division of prior U.S. application Ser. No. 07/486,916 filed Mar. 1, 1990 now U.S. Pat. No. 5,011,908 which is a continuation of application Ser. No. 07/217,645 filed Jul. 12, 1988 now abandoned.

FIELD OF THE INVENTION

This invention relates in general to certain novel polymer polyol compositions and their use in the production of flexible polyurethane foams. In one aspect, this invention relates to multicomponent compositions for making flexible polyurethane foams wherein the compositions are comprised of a high functionality polyol, a subsidiary polyol high in poly(oxyethylene) content and a stably dispersed polymer. In a further aspect, the invention is directed to the use of the polymer polyol compositions in the preparation of foams which affords enhanced latitude for varying formulation components. The invention also relates to foams and foamed articles prepared from formulations containing such compositions.

BACKGROUND OF THE INVENTION

Polyurethane foams are widely employed in the manufacture of a variety of products and, depending on the end use, can be tailor made to fit the particular application and desired physical properties. For example, high resilience (HR) foam is widely used in furniture, mattresses, automotive and numerous other applications. It is differentiated from conventional foam by its higher comfort or support factor and higher resilience. Specific guidelines have been set forth in ASTM Method D3770 for defining HR foams; however, in practice a much wider class of foams are described by this terminology and the present invention is intended to encompass this broader classification.

High resilience slabstock foam formulations employed commercially typically contain (1) a polymer polyol consisting of a polymer stably dispersed in a reactive ethylene oxide end-capped polyol having more than 50% primary hydroxyl groups; (2) water; (3) a low molecular weight crosslinker/extender, usually diethanolamine (4) a polyether-silicone copolymer stabilizer; (5) amine and tin catalysts; (6) toluene diisocyanate and miscellaneous other additives such as fillers, flame retardants, blowing agents and the like.

Molded high resilience foam can usually be made from high resilience slabstock systems by altering the catalyst compositions; the slabstock foam usually being made with significantly more tin catalyst than is desirable for processing molded foam. Slabstock foam is made almost exclusively with toluene diisocyanate isomer blends while blends of polymeric methylene diisocyanate and toluene diisocyanate are sometimes used for molded foam.

Typical unfilled and water-blown high resilience slabstock foams made commercially range from about 1.8 to 3.5 pounds per cubic foot (pcf) while those containing physical blowing agents are generally less than about 1.8 pcf. Loads (25% IFDs) range from about 20 to 80 pounds per 50 square inch for water blown foams down to 7 to 20 pounds per 50 square inch for foams containing physical blowing agents such as chlorofluorocarbons. Prior to the present invention, production of low density (less than about 1.8 pcf) and/or low load (less than 20 pounds/50 square inch) HR slabstock grades without physical blowing agents had been limited due to little or no processing latitude for the formulations necessary to make these grades.

The processing latitude of commercial HR slabstock foam is usually characterized by the diethanolamine (DEOA) and index ranges that give acceptable processing. A broad range is desirable for not only processing but also grade flexibility since load decreases as the DEOA level increases and index is decreased. The lower DEOA limit is characterized by excessive settle or collapse while, at the upper limit, the foam will show shrinkage (excessive tightness). For a typical commercial polymer polyol, the DEOA latitude will depend on factors such as isocyanate index, water level, catalyst types/levels, surfactant and machine parameters. In general, it becomes difficult to find a DEOA level that will yield stable and non-shrinking foam at water levels higher than about 3.2 and/or indices above 115 and below 100. This results in more off-grade production and increased manufacturing costs.

Although a wide variety of methods and polyurethane formulations have been reported in the patent literature, to date none has disclosed nor taught the polymer polyol compositions and formulations of the present invention.

Polymer polyols in which the polyols contain 3 to 10 percent ethylene oxide, have an equivalent weight greater than 1250 and have average functionality greater than 3.2 have been reported in U.S. Pat. No. 4,111,865 and are indicated to yield flexible foams with improved static fatigue and humid sensitivity. However, free-rise foams made with these compositions were tight and exhibited shrinkage.

U.S. Pat. No. 3,857,800 and British Patent No. 1,339,442 disclose the use of a subsidary polyol high in poly(oxyethylene) in conjunction with a polyoxyethylene capped oxypropylene polyol, wherein the subsidary polyol assists in opening the foam cells to avoid shrinkage. Examples are provided in which a crosslinking agent was used but no disclosure related to the use of polymer polyols was indicated. All commercially useful systems for producing high resilience foam rely on polymer polyols; whereas the stably dispersed polymer component provides shrinkage resistance. Ommission of polymer polyol from HR foam formulations employing catalyst combinations that yield commercially acceptable cure rates and silicone surfactants yielding acceptable cell structure results in severe shrinkage even if a subsidiary polyol high in poly(oxyethylene) is employed. The catalysts and stabilizer combinations utilized in the examples of this patent would not yield commercially viable systems for making flexible polyurethane foam. Processing latitude and formulating flexibility would be very limited.

Numerous other patents, both domestic and foriegn, disclose and claim various polyol blends but for the most part, none employs polymer polyols and/or else differ in the composition of the formulation such that desirable HR flexible foams having improved processing advantages are not provided. See for example, Japanese patents SHO 57-133112; SHO 57-195113; SHO 57-195725; and SHO 59-100125; U.S. Pat. No. 4,544,678; British Patent No. 1,480,972; U.S. Pat. No. 4,690,955, and the like.

Hence, prior to the present invention high resilience foam formulations were not readily available having the desirable latitude for varying formulation components without adversely affecting processing and desired physical properties. Current HR slabstock systems become deficient in processing as the water level in the formulation is increased to make lower density foams; and/or as the crosslinker level is increased or decreased beyond current limits; and/or as the index is increased or decreased beyond current limits. These limitations restrict the range of foam grades (i.e., density and load) that can be produced and limit the markets/applications in which they have been used.

Prior to the present invention the production of flexible HR foam densities below about 1.8 pcf and/or loads below about 20 pounds/50 square inch, typically required the use of blowing agents such as the halocarbons. However, due to environmental considerations, the current trend is to avoid or minimize the use of such blowing agents in the preparation of foams. Also, production of higher load HR grades has required the use of expensive load building additives that can now be eliminated or greatly reduced under the teachings of this invention.

OBJECTS OF THE INVENTION

Accordingly, one or more of the following objects will be achieved by the practice of this invention. It is an object of this invention to provide polymer polyol compositions for use in the production of high resilience, flexible, polyurethane foam. Another object is to provide polymer polyol compositions the use of which affords enhanced latitude for varying formulation components without adversely affecting processing conditions or foam properties. A further object of the present invention is to provide polymer polyol compositions useful for the production of HR flexible polyurethane foam which are comprised of multi-component polymer polyol systems. A still further object of this invention is to provide an improved process for the preparation of HR, flexible, polyurethane foam having enhanced formulating latitude and flexibility in the preparation of such foam. Another object of this invention is to provide formulations which are useful in the preparation of HR polyurethane foam which avoid or minimize the use of environmentally unacceptable blowing agents such as the halocarbons. A further object is to provide foams and foamed articles prepared from formulations containing the polymer polyol compositions of this invention. These and other objects will become apparent to those skilled in the art in the light of the teachings herein set forth.

SUMMARY OF THE INVENTION

In its broadest aspect, this invention is directed to polymer polyol compositions and to a method for their use in the production of flexible polyurethane foam. The invention is also directed to formulations containing the polymer polyols as well as foams and articles prepared therefrom. The novel compositions of this invention utilize a polymer polyol composition composed of (1) a high functionality polyol, (2) a subsidiary poly(alkylene oxide) high in poly(oxyethylene) content, and (3) a stably dispersed polymer. By utilizing the polymer polyol compositions of this invention unusually broad processing and formulation flexibility is provided for the production of HR polyurethane foams.

DETAILED DESCRIPTION OF THE INVENTION

As indicated above, this invention is directed, in part, to polymer polyol compositions useful in the production of flexible polyurethane foam and wherein the polymer polyol is composed of a high functionality polyol or a polyol blend, a subsidiary poly(alkylene oxide) and a stably dispersed polymer.

By the term "polymer polyol" or "polymer polyol composition" as employed throughout the specification and appended claims, is meant a stable dispersion of a solid polymer phase within the liquid polyol, polyol blend or polyol containing blend, wherein the solid polymer is formed by in situ polymerization of low molecular weight compounds within the liquid phase.

The first component is present in the polymer polyol composition in an amount of from about 30 to about 90 percent by weight based on the weight of the total composition and is a polyalkylene oxide polyol or blend of such polyols having an average nominal functionality such that the combination of the first and second components will have an average nominal functionality of about 3.0 or greater, and preferably within the range of from about 3.2 to about 6.0. In a preferred embodiment, the first component is a blend of a high primary hydroxyl poly(oxyethylene) end-capped poly(oxypropylene) polyol and a predominantly secondary hydroxyl polyalkylene oxide polyol.

The second component is present at between about 1 and about 20 weight percent and is a polyalkylene oxide containing greater than about 30% by weight of poly(oxyethylene).

The third component is present at between about 2 and about 50% by weight and is a stably dispersed polymer formed by the in situ polymerization of low molecular weight compounds within the blend of components 1 and 2 or within one or more of the polyalkylene oxides used to constitute components 1 and 2.

Such a polymer polyol composition yields stable and non-shrinking, flexible, polyurethane foam at higher water levels and over a wider crosslinker/extender and index range; thus allowing increased density and load latitude relative to current HR polymer polyols (See tables I, II, III, and X).

Accordingly, the present invention allows the production of lower density flexible foams and foams with increased load latitude. Current slabstock polymer polyols have limited processing latitude (narrow DEOA and index range) at water levels above about 3.2 parts per hundred (php) of the polymer polyol blend. In accordance with the present invention, good latitude has been maintained to greater than 4.5 php. The ability to make these low density grades coupled with the ability to make foams with a broader load range without blowing agent or load builder will make these blends commercially attractive for the production of polyurethane foam. As indicated previously, present environmental considerations are expected to lead to the avoidance of hydrocarbons such as the freons, as blowing agents in the production of urethane foams.

High density HR foams (>2.3 pcf) with wide load range also can be made with these polymer polyol combinations; thus offering the full range of high density HR foams currently produced plus the ability to make higher load grades (25% IFD of 40 lbs/50 sq. in, or higher) without the need for added load builders.

Various blends of polymer polyols within the scope of the present invention have shown good foam processing characteristics as will be evident from the data presented in Tables IV–VIII.

In practice the high functionality polyol can be polyalkylene oxide polyols or blends of such polyols of average nominal functionality between about 3 and about 6; having an ethylene oxide content between about 8% and about 25%; and an equivalent weight between about 1000 and about 3000, preferably from about 1600 to about 2200. The high functionality polyol can be employed at levels ranging from about 30% to about 90%, and preferably from about 40% to about 90%, based on the weight of the total blend.

The subsidiary polyalkylene oxide, the second component of the polymer polyol composition, can have a molecular weight between about 450 and about 30,000; nominal functionality up to about 8; and ethylene oxide content between about 30 and about 100%. The lower molecular weight (450 to 2000) liquids with ethylene oxide content greater than about 70% are preferred for ease in handling and optimum processing. The level of this second component can be varied from about 1% to about 20% by weight of the polymer polyol composition with 1% to about 10% as the preferred range.

The third component of the composition can be a standard vinyl polymer or copolymer; a polyurea-type polymer; or a condensation product of a polyfunctional low molecular weight glycol or glycol amine with a diisocyanate. This component is formed as a stable dispersion in one or more of the polyols by in situ polymerization of the monomers. The level of the stably dispersed polymer can vary between about 2% and about 50% by weight, with about 4% to about 30% being the preferred range for HR flexible foams.

The polyol compositions which can be utilized in the present invention can include a variety of compounds and encompass, but are not limited to, the following:

(a) alkylene oxide adducts of polyhydroxyalkanes;

(b) alkylene oxide adducts of nonreducing sugars and sugar derivatives; and (c) alkylene oxide adducts of polyphenols.

Illustrative alkylene oxide adducts of polyhydroxyalkanes include, among others, the alkylene oxide adducts of glycerine, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like.

A further class of polyols which can be employed are the above-mentioned alkylene oxide adducts of the nonreducing sugars, wherein the alkylene oxides have from 2 to 4 carbon atoms. Among the nonreducing sugars and sugar derivatives contemplated are sucrose, alkyl glycosides such as methyl glucoside, ethyl glucoside, and the like; glycol glycosides such as ethylene glycol glycoside, propylene glycol glycoside, glycerol glucoside, 1,2,6-hexanetriol glycoside, and the like, as well as the alkylene oxide adducts of the alkyl glycosides as set forth in U.S. Pat. No. 3,073,788.

A still further useful class of polyols as indicated in (c) above, is the polyphenols, and preferably the alkylene oxide adducts thereof wherein the alkylene oxides have from 2 to 4 carbon atoms. Among the polyphenols which are contemplated are, for example, condensation products of phenol and formaldehyde, and novolac resins; condensation products of various phenolic compounds and acrolein, the simplest member of this class being 1,2,3-tris(hydroxyphenyl) propanes; condensation products of various phenolic compounds and glyoxal, gluteraldehyde, and other dialdehydes, the simplest members of this class being the 1,1,2,2-tretrakis(hydroxyphenol)ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polymetaphosphoric acids such as tripolyphosphoric acid, the polymetaphosphoric acids, and the like are desirable for use in this connection.

Indeed, any material having an active hydrogen as determined by the Zerewitinoff test may be utilized as a component of the polyol. For example, amine-terminated polyether polyols are known and may be utilized, if desired. Table VIII contains an example in which an amine terminated polyether polyol is employed.

The most preferred polyols employed in this invention include the poly(oxypropylene-oxyethylene) glycols. Ethylene oxide, when used, can be incorporated in any fashion along the polymer chain. Stated another way, the ethylene oxide can be incorporated either in internal blocks, as terminal blocks, or may be randomly distributed along the polyol chain.

In addition to the aforementioned poly(alkylene oxide) components, the polyol composition may contain hydroxyl terminated polybutadiene. Also, addition of minor amounts of an alkenoic acid grafted polyalkylene oxide polyether may be employed to aid in reactivity control and cell opening. Examples of the use of these compounds can also be found in Table VIII.

The production of stably dispersed polymers within polyols to make polymer polyols is known in the art. The basic patents in the field are Stamberger Re. No. 28,715 (reissue of U.S. Pat. No. 3,383,351) and Re. No. 29,118 (reissue of U.S. Pat. No. 3,304,273). Such compositions can be produced by polymerizing one or more ethylenically unsaturated monomers dissolved or dispersed in a polyol in the presence of a free radical catalyst to form a stable dispersion of polymer particles in the polyol. These polymer polyol compositions have the valuable property of imparting to polyurethane foams produced therefrom higher load-bearing properties than are provided by the corresponding unmodified polyols. Also included are the polyols like those taught in U.S. Pat. Nos. 3,325,421 and 4,374,209.

A wide variety of monomers may be utilized in the preparation of the polymer polyol compositions in accordance with the invention. Numerous ethylenically unsaturated monomers are disclosed in the prior patents. Any of these monomers are suitable. More recently, polyurea and polyurethane suspension polymers have also been utilized.

The selection of the monomer or monomers used will depend on considerations such as the relative costs of the monomers and the polyurethane product characteristics required for the intended application. To impart the desired load-bearing to the foams, the monomer or monomers used in preparing the polymer polyol should, of course, desirably be selected to provide a polymer which has a glass transition of at least slightly higher than room temperature. Exemplary monomers include styrene and its derivatives such as para-methylstyrene, acrylates, methacrylates such as methyl methacrylate, acrylonitrile and other nitrile derivatives such as methacrylonitrile, and the like. Vinylidene chloride may also be employed.

The preferred monomer mixtures used to make the polymer polyol compositions are mixtures of acrylonitile and styrene or acrylonitrile, styrene and vinylidene chloride.

The monomer content will be typically selected to provide the desired solids content required for the anticipated end-use application. For typical HR foam formulations, solids content of up to about 50 weight percent are feasible and may be utilized.

Crosslinker/Extender

A low molecular weight polyfunctional glycolamine crosslinker/extender is preferred to make stable, free-rise foams under the conditions of this invention. Diethanolamine is the most commonly used commercial crosslinker and is the preferred compound of choice. Its use at levels of from about 0 to about 5 php, which is much broader than what is commercially used, i.e., about 0.6 to about 1.5 php, is facilitated by the polymer polyol compositions described herein, and this provides for substantially broader load control. Blends of other crosslinkers with diethanolamine can also provide similar advantages. Though diethanolamine is preferred, other crosslinkers, such as, glycerine, triethanolamine, sorbitol and many other low molecular weight polyfunctional hydroxy and/or amine compounds can be sustituted for diethanolamine if desired.

Catalysts

Any of a large number of polyurethane catalysts may be utilized for producing the polyurethane foam. Typical levels are from about 0.001 to about 2 php. Representative catalysts include: (a) tertiary amines such as bis(2,2'-dimethylamino)ethyl ether, trimethylamine, triethylamine, N-methylmorpholine, N,N-ethylmorpholine, N,N-dimethylbenzylamine, N,N-dimethylethanolamine N,N,N',N'-tetramethyl-1,3-butanediamine, pentamethyldipropylenetriamine, triethanolamine, triethylenediamine, pyridine oxide and the like; (b) strong bases such as alkali and alkaline earth metal hydroxides, alkoxides, and phenoxides; (c) acidic metal salts of strong acids such as ferric chloride, stannous chloride antimony trichloride, bismuth nitrate and chloride, and the like; (d) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceonealkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, an the reaction products of alcoholates with carboxylic acids, beta-diketones, and 2-(N,N-dialkylamino)alkanols, such as the well known chelates of titanium obtained by this or equivalent procedures; (g) salts of organic acids with a variety of metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaureate, dibutyltin maleate, dilauryltin diacetate, dioctyltin diacetate, dibutyltin-bis(4-methylaminobenzoate), dibuytyltindilaurylmercaptide, dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide) dibutyltin-bis(2-dimethylaminopentylate), dibutyltin dichloride, dioctyltin dichloride, and the like.

Stabilizers

It is also within the scope of the invention to employ, when applicable, small amounts, e.g., about 0.001 percent to about 5 percent by weight, based on the total reaction mixture, of a foam stabilizer. Suitable foam stabilizers or surfactants are known and may vary depending upon the particular polyurethane application. Suitable stabilizers for slabstock applications include "hydrolyzable" polysiloxane-polyoxyalkylene block copolymers such as the block copolymers described in U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. Nos. 3,505,377 and 3,686,254 and British Patent. Specification No. 1,220,471. The latter class of copolymers differs from the above-mentioned polysiloxane-polyoxyalklylene block copolymers in that the polysiloxane moiety is bonded to the polyoxy-alkylene moiety through direct carbon-to-silicon bonds, rather than through carbon-to-oxygen-to-silicon bonds. These various polysiloxane-polyoxyalkylene block copolymers preferably contain from 5 to 50 weight percent of polysiloxane polymer, with the remainder being polyoxyalkylene polymer. Yet another useful class of foam stabilizer is composed of the cyanoalkyl-polysiloxanes described in U.S. Pat. No. 3,905,924.

Although it is not required, a polyethersilicone copolymer with mixed hydroxy and methoxy capping of the polyether as described in U.S. Pat. No. 4,690,955 is preferred over less stabilizing HR surfactants to counteract destabilization from the subsidiary polyol in the polymer polyol compositions of the present invention.

Polyisocyanates

Another advantage of this invention is the wide latitude for varying the isocyanate index and still make stable foams with low shrinkage. Examples are provided (Table III) in which the 80/20 TDI index is varied between 90 and 120 for free rise foams. Commercial production with current polymer polyols ranges from about 100 to 115 index. The expanded load latitude offered by the expanded index range is clearly evident from the examples provided.

The organic polyisocyanates that are useful in producing polyurethane foam in accordance with this invention are organic compounds that contain at least two isocyanate groups. Such compounds are well known in the art. Suitable organic polyisocyanates include the hydrocarbon diisocyanates (e.g., the alkylene diisocyanates and the aryl diisocyanates, as well as known triisocyanates and polymethylene poly(phenylene isocyanates). Examples of suitable polyisocyanates are 2,4- diisocyanatotoluene, 2,6-diisocyanatotoluene, methylene bis(4-cyclohexylisocyanate), 1,8-diisocyanatooctane, 1,5-diisocyanato-2,2,4-trimethylpentane, 1,9-diisocyanatononane, 1,10-diisocyanatopropylether of 1,4-butylene glycol, 1,11-diisocyanatoundecane, 1,12-diisocyanatododecane bis(isocyanatohexyl) sulfide, 1,4-diisocyanatobenzene, 3,5-diisocyanato-o-xylene, 4,6-diisocyanato-m-xylene, 2,6-diisocyanato-p-xylene, 2,4-diisocyanato-1-chlorobenzene, 2,4-diisocyanato-1-nitrobenzene, 2,5-diisocyanate-1-nitrobenzene, 4,4'-diphenylmethylene diisocyanate, 2,4'-diphenylmethylene diisocyanate, and polymethylene poly(phenyleneisocyanates), and mixtures thereof. The preferred polyisocyanate is 80/20 TDI (a mixture of 80% 2,4-toluene diisocyanate and 20% 2,6-toluene diisocyanate).

Blowing Agents

Water can be used in an amount from about 1.0 to about 5.0 php to produce carbon dioxide by reaction with isocyanate and thus act as the blowing agent for the foam. Additionally, a combination of water and other blowing agents may be employed. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane, octafluorocyclobutane, and the like. However, as indicated previously, one of the advantages of the present invention is that the use of fluorocarbon blowing agents can be avoided or at least minimized in the foam formulation.

Another class of blowing agents include thermally unstable compounds which liberate gases upon heating such as N,N'-dimethyl-N,N'-dinitrosoterephthalamide, amine formates, formic acid and the like. The preferred method of foaming for producing flexible foams is the use of water, or a combination of water plus a fluorocarbon blowing agent such as trichloromonofluorocarbon. The quantity of blowing agent employed will vary with factors such as the density desired in the foamed product.

Other Additives

A variety of additional additives known to those skilled in the art may be incorporated in the foam formulations. These may include flame retardants, colorants, fillers and other materials. So called combustion modified HR foams can be produced with the polymer polyols described in the present invention through the use of dispersed melamine powder and/or flame retardants.

In practice, the formulations employed in preparing the foams of this invention are prepared by mixing the aforementioned components in standard foam processing equipment in accordance with techniques known to those skilled in the art. Due to the particular components employed in accordance with the teachings of this invention, a wider latitude is afforded to the operator in controlling the density, load and other physical properties of the resulting foam.

For example, in accordance with the invention foams can be prepared utilizing a wider range of water, DEOA and isocyanate formulation variables. The advantages of this flexibility in foam processing is that expanded density and load grades can be produced. Moreover, softer foams can be made without resorting to the use of fluorocarbons. Also higher load grades can be made without costly low building additives.

In one embodiment of this invention, a typical formulation can utilize a polyalkylene oxide polyol or polyol blend containing at least 10% ethylene oxide and having a nominal functionalilty of at least about 3.0, and an equivalent weight between about 1500 and about 3000. The particularly preferred composition is a blend of a high primary hydroxyl ethylene oxide end-caped polyol and a predominantly secondary hydroxyl polyol.

Hence, a typical formulation using the blends of the present invention in the preparation of a free-rise slabstock foam is comprised of a combination of the following components which yield a high quality polyurethane foam with stable processing to 5 php water and with wide diethanolamine and index latitude. These components are:

(a) 63% of a nominal six functional poly(oxypropylene-oxyethylene) polyol with equivalent weight of about 2000, a primary hydroxyl level greater than 80%, and an ethylene oxide content greater than 15%.

19% of a predominantly secondary hydroxyl poly(oxyethylene-oxypropylene) polyol with nominal functionality of 3, equivalent weight of about 1100, and an internal ethylene oxide content of about 10%.

(b) 2% of a predominantly poly(oxyethylene) polyol with nominal functionality of 3 and an equivalent weight of 330.

(c) 16% of a styrene/acrylonitrile copolymer stably dispersed within the polyols.

(d) Water levels between about 1.5 and about 5 parts per hundred of polymer polyol (php).

(e) Diethanolamine levels between about 0.4 and 5 php.

(f) Toluene diisocyanate (80/20) at 75 to 125 index-(stoichiometry).

(g) A blend of bis(2-dimethylaminomethyl)ether and triethylenediamine as the tertiary amine catalyst.

(h) Stannous octoate or dibutyltin dilaurate as tin catalyst.

(i) A polyether-silicone copolymer type surfactant.

(j) The remainder of standard additives, including blowing agents, flame retardants, fillers, colorants, and the like, as appropriate.

In the examples which follow, various abbreviations have been used to define the components employed in the preparation of the foams. These components are identified as follows:

Polyols

Polyol A—is a polyalkylene oxide triol (nominal) produced by reaction of propylene oxide with glycerine followed by reaction with ethylene oxide and then capping with propylene oxide to reach an equivalent weight of about 1180. It contains about 10% internal ethylene oxide and has predominantly secondary hydroxyl groups.

Polyol B—is a polyalkylene oxide hexol (nominal) produced by reaction of propylene oxide with sorbitol and then end-capping with ethylene oxide. The product contains 16.0% ethylene oxide and has a primary hydroxyl level of about 83%. It has an equivalent weight of about 2000.

Polyol C—is similar to Polyol B except it contains about 11% ethylene oxide.

Polyol D—is similar to Polyol B except it contains about 23% ethylene oxide.

Polyol E—is similar to Polyol B except it contains about 20% ethylene oxide.

Polyol F—is a polyalkylene oxide triol produced by reaction of ethylene oxide with glycerine to an equivalent weight of about 330. It is about 90% ethylene oxide.

Polyol G—is similar to Polyol F except it has an equivalent weight of about 670.

Polyol H—is similar to Polyol F except it has an equivalent weight of about 170.

Polyol I—is similar to Polyol F except it has an equivalent weight of about 6700.

Polyol J—is a polyalkylene oxide triol produced by reaction of ethylene oxide with a propoxylated glycerine starter to an equivalent weight of about 700. It is about 65% ethylene oxide.

Polyol K—is a polyalkylene oxide diol produced by reaction of ethylene oxide to an equivalent weight of about 1700. It is 100% ethylene oxide.

Polyol L—is a polyalkylene oxide hexol produced by reaction of ethylene oxide with a propoxylated sorbitol starter to an equivalent weight of about 400. It is about 50% ethylene oxide.

Polyol M—is similar to Polyol L except it is ethoxylated to an equivalent weight of about 800.

Polyol N—is a 10% graft of acrylic acid on a polyalkylene oxide polymer produced by reacting ethylene-/propylene oxide with butanol.

Polyol O—is a polyalkylene oxide diol produced by reaction of propylene oxide to an equivalent weight of about 1000.

Polyol P—is a polyalkylene oxide diol (nominal) produced by reaction of propylene oxide to an equivalent weight of about 2000.

Polyol Q—is a polyalkylene oxide triol (nominal) produced by reacting propylene oxide onto glycerine followed by ethylene oxide (17%) and finally capped with propylene oxide to yield an equivalent weight of about 2000.

Polymer Polyols (PP)

PP-A—A commercial HR polymer polyol containing about 11% of a styrene acrylonitrile suspension copolymer in a blend of oxyethylene capped poly(oxypropylene) polyols.

PP-B—A commercial HR polymer polyol similar to PP-A.

PP-C—A polymer polyol consisting of three main components: (1) 15 weight percent of a styrene-acrylonitrile suspension copolymer; (2) 65% of Polyol B; and (3) 20% of Polyol A.

PP-D—Similar to PP-C except also containing a trace (about 0.1%) of Polyol N.

PP-E—Similar to PP-C except component (3) is replaced with Polyol D.

PP-F—A polymer polyol consisting of three main components: (1) 16 weight of a styrene-acrylonitile suspension copolymer; (2) 44% of Polyol-B; and (3) 40% of a 1600 equivalent weight and nominally three functional polyol prepared by reacting propylene oxide onto glycerine and capping with 16.5% ethylene oxide.

PP-G—A polymer polyol consisting of four main components: (1) 16 weight percent of a styrene-acrylonitrile suspension copolymer; (2) 32% of Polyol E; (3) 20% of Polyol A; and (4) 32% of a 2000 equivalent weight and nominally three functional polyol prepared by reacting propylene oxide onto glycerine and capping with 16% ethylene oxide.

PP-H—A polymer polyol consisting of four main components: (1) 17 weight percent of a styrene-acrylonitrile suspension copolymer; (2) 32% of Polyol C; (3) 20% of Polyol A; and (4) 31% of a 1600 equivalent weight and nominally three functional polyol prepared by reacting propylene oxide onto glycerine and capping with 16.5% ethylene oxide.

PP-I—A polymer polyol consisting of four main components: (1) 17 weight percent of a styrene-acrylonitrile suspension copolymer; (2) 40% of a 1600 equivalent weight and nominally four functional polyol prepared by reacting propylene oxide onto pentaetythritol and capping with 15% ethylene oxide; (3) 20% of Polyol A; and (4) 23% of a 1600 equivalent weight and nominally three functional polyol prepared by reacting propylene oxide onto glycerine and capping with 16.5% ethylene oxide.

PP-J—A polymer polyol consisting of three main components: (1) 18.5 weight percent of a styrene-acrylonitrile suspension copolymer; (2) 59% of Polyol B; and (3) 22.5% of Polyol A.

PP-K—A polymer polyol consisting of four main components: (1) 16 weight percent of a styrene-acrylonitrile suspension copolymer; (2) 55% of Polyol E; (3) 19% of Polyol A; and 10% of Polyol O.

PP-L—A polymer polyol consisting of three main components: (1) 15 weight percent of a styrene-acrylonitrile-vinylidene chloride suspension terpolymer; (2) 65% of Polyol B; and (3) 20% of Polyol Q.

PP-M—A polymer polyol consisting of four main components: (1) 17 weight percent of a styrene-acrylonitrile-vinylidene chloride suspension terpolymer; (2) 31% of Polyol B; (3) 20% of Polyol Q; and (4) 32% of a 1600 equivalent weight and nominally three functional polyol prepared by reacting propylene oxide onto glycerine and capping with 19% ethylene oxide.

PP-N—A polymer polyol consisting of four main components: (1) 17 weight percent of a styrene-acrylonitrile-vinylidene chloride suspension terpolymer; (2) 40% of Polyol B; (3) 20% of Polyol Q; and (4) 23% of a 1400 equivalent weight and nominally two functional polyol prepared by reacting propylene oxide onto glycerine and capping with 17% ethylene oxide.

PP-O—A polymer polyol consisting of four main components: (1) 17 weight percent of a styrene-acrylonitrile-vinylidene chloride suspension terpolymer; (2) 30% of Polyol B; (3) 20% of Polyol Q; and (4) 33% of a 1600 equivalent weight and nominally three functional polyol prepared by reacting propylene oxide onto glycerine and capping with 19% ethylene oxide.

PP-P—A polymer polyol consisting of three main components: (1) 8 weight percent of a styrene-acryolnitrile suspension copolymer; (2) 80% of Polyol B; and (3) 12% of Polyol A.

PP-Q—A polymer polyol consisting of three main components: (1) 24 weight percent of a styrene-acrylonitrile suspension copolymer; (2) 40% of Polyol B; and (3) 36% of Polyol A.

PP-R—A polymer polyol consisting of four main components: (1) 12 weight percent of a polyurea suspension copolymer; (2) 45% of Polyol B; (3) 20% of Polyol A and (4) 23% of a 1700 equivalent weight and nominally three functional polyol prepared by reacting propylene oxide onto glycerine and capping with 16% ethylene oxide.

PP-S—A polymer polyol consisting of four main components: (1) 4 weight percent of a polyurethane suspension copolymer (condensation product of TDI and triethanolamine); (2) 45% of Polyol B; (3) 20% of Polyol A and (4) 31% of a 1600 equivalent weight and nominally three functional polyol prepared by reacting propylene oxide onto glycerine and capping with 15% ethylene oxide.

PP-T—A polymer polyol consisting of four main components: (1) 16 weight percent of a styrene-acrylonitrile suspension copolymer; (2) 44% of Polyol B; (3) 20% of Polyol A and (4) 20% of a 2000 equivalent weight and nominally three functional amine terminated polyol prepared by reacting propylene oxide onto glycerine and terminated with an amine.

PP-U—A polymer polyol consisting of four main components: (1) 18 weight percent of a styrene-acrylonitrile suspension copolymer; (2) 56% of Polyol B; (3) 23% of Polyol A; and (4) 3% of a 1250 equivalent weight polybutadiene polyol.

PP-V—A polymer polyol consisting of three main components: (1) 18 weight percent of a styrene-acrylonitrile suspension copolymer; (2) 49% of Polyol B; and (3) 33% of a 1600 equivalent weight and nominally three functional polyol prepared by reacting propylene oxide onto glycerine and then capping with 19% ethylene oxide.

PP-W—A polymer polyol consisting of four main components: (1) 16 weight percent of a styrene-acrylonitrile suspension copolymer; (2) 61% of Polyol B; (3) 20% of Polyol A; and (4) 3% of Polyol P.

PP-X—A polymer polyol consisting of four main components: (1) 18 weight percent of a styrene-acrylonitrile suspension copolymer; (2) 56% pf Polyol B; (3) 23% of Polyol A; and (4) 3% of Polyol P.

Crosslinkers/Extenders

DEOA is diethanolamine.
MEOA is methyl(ethanolamine)
EOA is mono-ethanolamine

Catalysts

A-1 is a commercial tertiary amine catalyst sold by Union Carbide Corporation.
C-183 is a commercial tertiary amine catalyst sold by Union Carbide Corporation.
T-9 and D-19 are predominantly stannous octoate.
T-12 and D-22 are predominantly dibutyltin dilaurate.

Surfactants

SURF-A is an alkoxy capped polyether—silicone copolymer. It is a standard commercial HR surfactant.
SURF-B is a polyether—silicone copolymer with mixed hydroxy and methoxy capping. It is slightly more stabilizing than SURF A.
SURF-C is a polyether—silicone copolymer with mixed hydroxy and methoxy capping. It is more stabilizing than SURF A.
SURF-D is an alkoxy capped polyether—silicone copolymer similar to SURF A.

Flame Retardants

T-101 (Thermolin 101) is a commercial organo(chlorophosphate) flame retardant sold by the Olin Corporation.
DE-60F Special is a commercial flame retardant composed of a brominated aromatic compound and an organo(chlorophosphate) sold by Great Lakes Chemical Co.
CEF is a commercial organo(chorophosphate) flame retardant sold by Stauffer Corporation.

Blowing Agents

F-11C is essentially trichlorofluoromethane (fluorocarbon 11).

Diisocyanate

INDEX is the percentage of the calculated stoichiometric amount of TDI needed to react with active hydrogen components in the formulation and represents the stoichiometric amount of TDI used. For example, Index of 110 indicates 110% of the stoichiometric amound of TDI was used. If not specified in the Tables, Index refers to the amount of 80/20 TDI that was used.

80/20 TDI is a mixture of 80% of 2,4-toluenediisocyanate and 20% 2,6-toluenediioscyanate.

65/35 TDI is a mixture of 65% of 2,4-toluenediisocyanate and 35% 2,6-toluenediioscyanate.

Processing and Physical Property Terms

Cream Time is the time from mixing TDI with the other components until a noticeable expansion of the foam mixture occurs.

Rise Time is the time from mixing TDI with the other components until a visible blow-off of gas occurs at near full rise of the foam.

Percent Settle is the percentage of height loss (from the maximum foam height) at the five minute point after TDI addition to the other components.

Shrinkage is an indication of the amount of foam shrinkage that occurs during cooling of the foam. Moderate shrinkage is considered unacceptable for processing.

Porosity is a measure of the air flow rate (cubic feet per minute per square foot) through a slice of the foam after crushing to open cell windows.

Measurements per Standard Methods

Density—pounds per cubic foot.
Resiliency—percent ball rebound
IFD 25% (25% IFD)—load (indentation force deflection) at 25% compression in pounds per 50 square inches.
IFD 65% (65% IFD)—load (indentation force deflection) at 65% compression in pounds per 50 square inches.

EXAMPLES 1–59

In the examples which follow, bench scale foams (Examples 1–51) were prepared by weighing together all of the formulation ingredients except TDI and stannous octoate catalyst (if used) into a one half or one gallon paper can, then mixing at 2400 rpm for 15 seconds using a drill press equipped with a bladed agitator. A baffle is inserted into the paper can and mixing is resumed for 60 seconds. Then the mixture is allowed to stand for 15 seconds during which time stannous octoate is added (if used). Mixing is resumed for 15 seconds with the isocyanate being added with seven seconds left in this period. This complete mixture is quickly poured into a 14×14×6" "cake" box and allowed to foam. The profile and settle are recorded for five minutes and then the foam is placed in a forced air oven at 125° C. for five minutes. After removing from the oven, the foam is allowed to cure at ambient conditions, for at least 16 hours. Indications of foam shrinkage are noted after this period and then the foam is cut to 12×12×4" for physical property measurements.

Machine foams (Examples 52-59) were prepared using a pilot scale low pressure conventional slabstock foam machine. A premix was made of all the components except TDI and stannous octoate (when used), these being injected along with the premix through separate streams to the mixhead. Slabstock buns were made having cross sections of about 36 inches wide by 18 to 24 inches high. Test specimens (15×15×4″) were cut from the center of each bun. All of the samples were evaluated in accordance with tests normally employed in the industry. The results are set forth in Tables I-X below.

TABLE I

COMPARISON OF DIETHANOLAMINE FORMULATING LATITUDE FOR PREFERRED POLYMER POLYOL COMPOSITIONS AND COMMERCIAL HR SLABSTOCK FOAM POLYMER POLYOLS (PP-A, PP-B)

|  | EXAMPLE 1 | EXAMPLE 2 | EXAMPLE 3 | EXAMPLE 4 | EXAMPLE 5 |
|---|---|---|---|---|---|
| PP-A | 100.00 |  |  | 100.00 |  |
| PP-B |  | 100.00 |  |  |  |
| PP-C |  |  | 98.00 |  | 98.00 |
| POLYOL-F |  |  | 2.00 |  | 2.00 |
| WATER | 3.75 | 3.75 | 3.75 | 3.75 | 3.75 |
| DEOA | .60 | .80 | .60 | 1.25 | 1.30 |
| C-183 | .20 | .20 | .20 | .20 | .20 |
| T-9 | .13 | .13 | .13 | .13 | .13 |
| SURF-A | 1.00 | 1.00 |  |  |  |
| SURF-B |  |  | .30 | .30 | .30 |
| INDEX | 110.00 | 110.00 | 110.00 | 110.00 | 110.00 |
| CREM TIME | 7.00 | 8.00 | 9.00 | 8.00 | 8.00 |
| RISE TIME |  |  | 99.00 |  | 88.00 |
| % SETTLING |  |  | .95 | 4.14 | 2.37 |
| SHRINKAGE |  |  | NIL | MODERATE | SLIGHT |
| COMMENTS | COLLAPSE | COLLAPSE |  | NO BLOWOFF |  |
| DENSITY |  |  | 1.60 | 1.56 | 1.56 |
| RESILIENCY |  |  | 43.00 | 55.00 | 50.00 |
| POROSITY |  |  | 42.77 | 37.38 | 31.99 |
| IFD 25% |  |  | 41.75 | 29.40 | 34.40 |
| IFD 65% |  |  | 85.50 | 63.00 | 72.98 |

|  | EXAMPLE 6 | EXAMPLE 7 | EXAMPLE 8 |
|---|---|---|---|
| PP-A | 100.00 |  |  |
| PP-B |  | 100.00 |  |
| PP-C |  |  | 98.00 |
| POLYOL-F |  |  | 2.00 |
| WATER | 3.75 | 3.75 | 3.75 |
| DEOA | 3.00 | 3.00 | 3.00 |
| C-183 | .10 | .10 | .10 |
| T-9 | .13 | .13 | .13 |
| SURF-A | 1.00 | 1.00 |  |
| SURF-B |  |  | .30 |
| INDEX | 110.00 | 110.00 | 110.00 |
| CREM TIME | 8.00 | 8.00 | 8.00 |
| RISE TIME |  |  | 100.00 |
| % SETTLING | 5.11 | 2.39 | 2.56 |
| SHRINKAGE | MODERATE | MODERATE | SLIGHT |
| COMMENTS | NO BLOWOFF | NO BLOWOFF |  |
| DENSITY | 1.64 | 1.51 | 1.63 |
| RESILIENCY | 61.00 | 54.00 | 57.00 |
| POROSITY | 40.08 | 48.16 | 62.17 |
| IFD 25% | 23.00 | 24.25 | 30.00 |
| IFD 65% | 55.50 | 55.25 | 70.50 |

TABLE II

COMPARISON OF PROCESSING OF HIGH WATER FORMULATIONS FOR PREFERRED POLYMER POLYOL COMPOSITIONS AND COMMERCIAL HR POLYMER POLYOLS (PP-A, PP-B)

|  | EXAMPLE 9 | EXAMPLE 10 | EXAMPLE 11 | EXAMPLE 12 | EXAMPLE 13 | EXAMPLE 14 |
|---|---|---|---|---|---|---|
| PP-A | 98.00 |  |  |  |  | 100.00 |
| PP-C |  | 98.00 |  |  |  |  |
| PP-B |  |  | 98.00 |  |  |  |
| PP-D |  |  |  | 97.00 | 98.00 |  |
| POLYOL-F | 2.00 | 2.00 | 2.00 |  | 2.00 |  |
| POLYOL-G |  |  |  | 3.00 |  |  |
| WATER | 4.50 | 4.50 | 4.50 | 5.00 | 4.50 | 4.50 |
| DEOA | 3.00 | 3.00 | 3.00 | 2.00 | 3.00 | 3.00 |
| C-183 | .10 | .10 | .10 | .15 | .15 | .15 |
| T-9 | .15 | .15 | .15 |  | .15 | .15 |
| D-19 |  |  |  | .075 |  |  |
| SURF-B | .30 | .30 | .30 |  | .30 |  |
| SURF-A |  |  |  | 2.50 |  | 1.50 |
| T-101 | 2.00 | 2.00 | 2.00 |  |  |  |
| DE 60FSp |  |  |  | 1.00 | 2.00 | 2.00 |
| INDEX | 105.00 | 105.00 | 105.00 | 110.00 | 115.00 | 115.00 |

TABLE II-continued

COMPARISON OF PROCESSING OF HIGH WATER FORMULATIONS
FOR PREFERRED POLYMER POLYOL COMPOSITIONS AND COMMERCIAL
HR POLYMER POLYOLS (PP-A, PP-B)

|  | EXAMPLE 9 | EXAMPLE 10 | EXAMPLE 11 | EXAMPLE 12 | EXAMPLE 13 | EXAMPLE 14 |
|---|---|---|---|---|---|---|
| CREM TIME | 9.00 | 9.00 | 9.00 | 13.00 | 8.00 | 8.00 |
| RISE TIME |  | 97.00 |  | 115.00 | 94.00 |  |
| % SETTLING |  | 2.03 |  | 6.22 | 6.10 |  |
| SHRINKAGE |  | NIL |  | NIL | NIL |  |
| COMMENTS | COLLAPSE |  | COLLAPSE |  |  | COLLAPSE |
| DENSITY |  | 1.46 |  | 1.34 | 1.49 |  |
| POROSITY |  | 26.60 |  | 21.21 | 31.99 |  |
| IFD 25% |  | 28.25 |  | 29.00 | 25.50 |  |
| IFD 65% |  | 63.75 |  | 62.00 | 64.75 |  |

TABLE III

EXAMPLES SHOWING FLEXIBILITY FOR MAKING HR
FOAMS WITH BROAD LOAD AND DENSITY RANGES
USING PREFERRED POLYMER POLYOL COMPOSITIONS

|  | EXAMPLE 15 | EXAMPLE 16 | EXAMPLE 17 | EXAMPLE 18 | EXAMPLE 19 | EXAMPLE 20 |
|---|---|---|---|---|---|---|
| PP-C | 98.00 |  | 97.00 | 97.00 | 97.00 | 97.00 |
| PP-A |  | 100.00 |  |  |  |  |
| POLYOL-F | 2.00 |  |  |  |  |  |
| POLYOL-G |  |  | 3.00 | 3.00 | 3.00 | 3.00 |
| WATER | 4.50 | 4.50 | 5.00 | 4.25 | 4.25 | 1.90 |
| F-11C |  |  |  |  | 10.50 |  |
| DEOA | 1.30 | 1.30 | 3.00 | 5.00 | 3.00 | .80 |
| C-183 | .10 | .15 | .15 | .10 | .15 | .15 |
| T-9 | .15 | .15 |  |  |  |  |
| D-19 |  |  | .15 | .125 | .125 | .125 |
| SURF-B | .30 |  | .40 | .30 | .30 | .25 |
| SURF-A |  | 1.50 |  |  |  |  |
| T-101 | 2.00 | 2.00 |  |  |  |  |
| DE 60FSp |  |  | 1.00 |  |  |  |
| INDEX | 105.00 | 105.00 | 95.00 | 90.00 | 90.00 | 120.00 |
| TECH NAME | SMITH | SMITH | SMITH | SMITH | SMITH | SMITH |
| CREM TIME | 10.00 | 9.00 | 11.00 | 6.00 | 10.00 | 11.00 |
| RISE TIME | 105.00 | 97.00 | 85.00 | 87.00 | 140.00 | 140.00 |
| % SETTLING | 1.02 | 2.19 | 3.07 | 3.55 | 2.31 | 1.18 |
| SHRINKAGE | NIL | NIL | NIL | V. SLIGHT | NIL | NIL |
| DENSITY | 1.38 | 1.42 | 1.28 | 1.53 | 1.26 | 2.80 |
| RESILIENCY | 42.00 | 49.00 | 51.00 | 57.00 | 52.00 | 49.00 |
| POROSITY | 31.99 | 31.99 | 26.60 | 92.36 | 67.56 | 18.52 |
| IFD 25% | 37.50 | 29.00 | 17.75 | 12.25 | 12.25 | 54.73 |
| IFD 65% | 77.00 | 61.50 | 42.50 | 33.00 | 29.00 | 117.75 |

TABLE IV

EXAMPLES OF MODIFICATIONS OF COMPONENT 1
(HIGH FUNCTIONALITY POLYOL) OF POLYMER
POLYOL COMPOSITIONS

|  | EXAMPLE 21 | EXAMPLE 22 | EXAMPLE 23 | EXAMPLE 24 | EXAMPLE 25 |
|---|---|---|---|---|---|
| PP-E | 98.00 |  |  |  |  |
| PP-F |  | 98.00 |  |  |  |
| PP-G |  |  | 98.00 |  |  |
| PP-H |  |  |  | 98.00 |  |
| PP-I |  |  |  |  | 98.00 |
| POLYOL-F | 2.00 | 2.00 | 2.00 | 2.00 | 2.00 |
| WATER | 3.75 | 3.75 | 3.75 | 3.75 | 3.75 |
| DEOA | 3.00 | 3.00 | 3.00 | 1.25 | 1.25 |
| C-183 | .15 | .15 | .10 | .20 | .20 |
| D-19 | .10 |  |  |  |  |
| T-9 |  | .15 | .15 | .15 | .15 |
| SURF-A | 1.50 |  |  | 2.50 |  |
| SURF-B |  | .30 |  | .30 | .30 |
| T-101 |  | 2.00 | 2.00 | 2.00 | 2.00 |
| INDEX | 110.00 | 110.00 | 110.00 | 110.00 | 110.00 |
| CREM TIME | 11.00 | 7.00 | 8.00 | 10.00 | 10.00 |
| RISE TIME | 102.00 | 100.00 | 105.00 | 98.00 | 107.00 |
| % SETTLING | 4.08 | 3.56 | 2.68 | 1.52 | 1.54 |
| SHRINKAGE | SLIGHT | SLIGHT | SLIGHT | SLIGHT | SL-MOD |
| DENSITY | 1.58 | 1.65 | 1.68 | 1.67 | 1.63 |
| RESILIENCY | 61.00 | 58.00 | 52.00 | 47.00 | 48.00 |
| POROSITY | 42.77 | 37.38 | 13.78 | 23.91 | 31.99 |
| IFD 25% | 21.75 | 24.75 | 33.50 | 41.50 | 37.47 |
| IFD 65% | 53.00 | 60.25 | 74.25 | 89.25 | 78.17 |

|  | EXAMPLE 26 | EXAMPLE 27 | EXAMPLE 28 | EXAMPLE 29 | EXAMPLE 30 | EXAMPLE 31 |
|---|---|---|---|---|---|---|

TABLE IV-continued

|  |  |  |  |  |  |  |
|---|---|---|---|---|---|---|
| PP-K | 98.00 |  |  |  |  |  |
| PP-L |  | 98.00 |  |  |  |  |
| PP-M |  |  | 98.00 |  |  |  |
| PP-N |  |  |  | 98.00 |  |  |
| PP-O |  |  |  |  | 98.00 | 98.00 |
| POLYOL-F | 2.00 | 2.00 | 2.00 | 2.00 | 2.00 | 2.00 |
| WATER | 3.75 | 3.75 | 3.75 | 3.75 | 3.75 | 3.75 |
| DEOA | 3.00 | 2.50 | 3.00 | 3.00 | 3.00 | 3.00 |
| C-183 | .15 | .15 | .15 | .15 | .20 | .15 |
| D-19 | .125 |  |  |  |  |  |
| T-9 |  | .15 | .13 | .125 | .11 | .13 |
| SURF-B | .25 | .30 | .20 | .20 | .25 | .20 |
| SURF-D |  |  | 1.00 |  | .50 | 1.00 |
| SURF-A |  |  |  | 1.00 |  |  |
| T-101 |  | 2.00 | 1.00 | 1.00 | 1.00 | 1.00 |
| INDEX | 110.00 | 110.00 | 110.00 | 110.00 | 110.00 | 110.00 |
| CREM TIME | 11.00 | 9.00 | 8.00 | 9.00 | 7.00 | 8.00 |
| RISE TIME | 86.00 | 105.00 | 118.00 | 136.00 | 114.00 | 118.00 |
| % SETTLING | 3.52 | 1.09 | 3.65 | 2.33 | 4.95 | 3.65 |
| SHRINKAGE | NIL | SLIGHT | NIL | NIL | SLIGHT | NIL |
| DENSITY | 1.65 | 1.65 | 1.73 | 1.90 | 1.72 | 1.73 |
| RESILIENCY | 57.00 | 55.00 | 55.00 | 52.00 | 56.00 | 55.00 |
| POROSITY | 45.47 | 37.38 | 18.52 | 31.99 | 31.99 | 18.52 |
| IFD 25% | 25.08 | 28.20 | 30.25 | 26.25 | 27.75 | 30.25 |
| IFD 65% | 57.33 | 62.25 | 72.75 | 64.17 | 66.50 | 72.75 |

TABLE V

EXAMPLES OF MODIFICATIONS TO POLYOL COMPONENT 2 (HIGH OXYETHYLENE POLYOL)

|  | EXAMPLE 32 | EXAMPLE 33 | EXAMPLE 34 | EXAMPLE 35 | EXAMPLE 36 |
|---|---|---|---|---|---|
| PP-J | 97.00 | 97.00 | 95.00 | 97.00 | 97.00 |
| POLYOL-M | 3.00 |  |  |  |  |
| POLYOL-K |  | 3.00 |  |  |  |
| POLYOL-M |  |  | 5.00 |  |  |
| POLYOL-L |  |  |  | 3.00 |  |
| POLYOL-I |  |  |  |  | 3.00 |
| WATER | 3.75 | 3.75 | 3.75 | 3.75 | 3.75 |
| DEOA | 3.00 | 3.00 | 3.00 | 3.00 | 3.00 |
| C-183 | .15 | .15 | .15 | .15 | .15 |
| D-19 | .125 | .125 | .125 | .10 | .10 |
| SURF-B | .25 | .25 |  |  |  |
| SURF-A |  |  | 1.50 | 1.50 | 1.50 |
| INDEX | 110.00 | 110.00 | 110.00 | 110.00 | 110.00 |
| CREM TIME | 11.00 | 11.00 | 10.00 | 11.00 | 11.00 |
| RISE TIME | 101.00 | 89.00 | 85.00 | 104.00 | 96.00 |
| % SETTLING | .60 | 3.13 | 3.28 | 2.59 | 6.90 |
| SHRINKAGE | SLIGHT | NIL | NIL | NIL | NIL |
| COMMENTS | V. SLIGHT BLOWOFF |  |  |  |  |
| DENSITY | 1.56 | 1.61 | 1.61 | 1.65 | 1.69 |
| RESILIENCY | 51.00 | 55.00 | 44.00 | 50.00 | 52.00 |
| POROSITY | 37.38 | — | 50.86 | 21.21 | 54.63 |
| IFD 25% | 24.75 | 23.00 | 19.48 | 26.08 | 22.00 |
| IFD 65% | 59.00 | 55.25 | 47.63 | 62.90 | 54.28 |

TABLE VI

EXAMPLES OF MODIFICATIONS TO THE LEVEL OF POLYOL COMPONENT 2 (HIGH OXYETHYLENE POLYOL)

|  | EXAMPLE 37 | EXAMPLE 38 | EXAMPLE 39 |
|---|---|---|---|
| PP-J | 98.00 | 99.00 | 95.00 |
| POLYOL-J | 2.00 | 1.00 | 5.00 |
| DEOA | 3.00 | 3.00 | 3.00 |
| C-183 | .15 | .15 | .15 |
| D-19 | .125 | .125 | .125 |
| SURF-A | 1.50 | 1.50 | 1.50 |
| INDEX | 120.00 | 110.00 | 110.00 |
| CREM TIME | 8.00 | 7.00 | 7.00 |
| RISE TIME | 85.00 | 90.00 | 86.00 |
| % SETTLING | 2.83 | 1.53 | 4.53 |
| SHRINKAGE | NIL | SLIGHT | NIL |
| DENSITY | 1.70 | 1.62 | 1.70 |
| RESILIENCY | 50.00 | 54.00 | 58.00 |
| POROSITY | 26.60 | 34.68 | 40.08 |
| IFD 25% | 27.20 | 23.50 | 20.40 |
| IFD 65% | 69.25 | 57.20 | 49.88 |

TABLE VII

EXAMPLES OF MODIFICATIONS TO COMPONENT 3 (STABLY DISPERSED POLYMER) IN POLYMER POLYOL COMPOSITIONS

|  | EXAMPLE 40 | EXAMPLE 41 | EXAMPLE 42 | EXAMPLE 43 | EXAMPLE 44 |
|---|---|---|---|---|---|
| PP-P | 97.00 | | | | |
| PP-J | | 97.00 | | | |
| PP-Q | | | 97.00 | | |
| PP-R | | | | 98.00 | |
| PP-S | | | | | 98.00 |
| POLYOL-F | | | | 2.00 | 2.00 |
| POLYOL-J | 3.00 | 3.00 | 3.00 | | |
| WATER | 3.75 | 3.75 | 3.75 | 3.75 | 3.75 |
| DEOA | 3.00 | 3.00 | 3.00 | 1.25 | 1.25 |
| C-183 | .15 | .15 | .15 | .20 | .20 |
| D-19 | .125 | .125 | .125 | | |
| T-9 | | | | .125 | .125 |
| SURF-A | 1.00 | 1.00 | 1.00 | | |
| SURF-B | | | | .30 | .30 |
| T-101 | | | | 2.00 | 2.00 |
| INDEX | 110.00 | 110.00 | 110.00 | 110.00 | 110.00 |
| CREM TIME | 7.00 | 8.00 | 10.00 | 10.00 | 7.00 |
| RISE TIME | 85.00 | 85.00 | | 127.00 | 101.00 |
| % SETTLING | 4.86 | 4.40 | 3.17 | 1.07 | 1.64 |
| SHRINKAGE | NIL | NIL | SLIGHT | MOD-SEVERE | SLIGHT |
| COMMENTS | | | NO BLOWOFF | | |
| DENSITY | 1.67 | 1.66 | 1.65 | 1.59 | 1.70 |
| RESILIENCY | 61.00 | 58.00 | 41.00 | 53.00 | 54.00 |
| POROSITY | 77.27 | 31.99 | 42.77 | 21.21 | 18.52 |
| IFD 25% | 17.20 | 22.55 | 30.73 | 30.75 | 29.00 |
| IFD 65% | 41.15 | 53.98 | 73.13 | 66.25 | 63.25 |

TABLE VIII

EXAMPLES OF MISCELLANEOUS MODIFICATIONS TO POLYMER POLYOL AND FOAM FORMULATING.

|  | EXAMPLE 45 | EXAMPLE 46 | EXAMPLE 47 | EXAMPLE 48 |
|---|---|---|---|---|
| PP-D | | | 98.00 | 98.00 |
| PP-T | 98.00 | | | |
| PP-U | | 98.00 | | |
| POLYOL-F | 2.00 | 2.00 | 2.00 | 2.00 |
| WATER | 3.75 | 3.75 | 3.75 | 2.30 |
| DEOA | 3.00 | 3.00 | 3.00 | 0.75 |
| C-183 | .10 | .15 | .10 | 0.17 |
| T-9 | .15 | | .16 | |
| D-22 | | | | 0.12 |
| D-19 | | .1250 | | |
| SURF-A | .30 | .25 | .30 | 0.20 |
| T-101 | 2.00 | | 2.00 | |
| MELAMINE | | | | 100.00 |
| CEF | | | | 5.00 |
| DE 60F SP. | | | | 6.00 |
| TDI-80/20 | 53.20 | 53.66 | | 30.10 |
| TDI-65/35 | | | 53.26 | |
| INDEX | 110.0 | 110.0 | 110.0 | 105.0 |
| CREM TIME | 9.00 | 11.00 | 10.00 | 11.00 |
| RISE TIME | 103.00 | 99.00 | 95.00 | 221.00 |
| % SETTLING | 6.25 | 2.02 | 5.54 | 0.90 |
| SHRINKAGE | NIL | SLIGHT | NIL | NIL |
| DENSITY | 1.72 | 1.59 | 1.72 | 4.68 |
| RESILIENCY | 58.00 | 53.00 | 48.00 | 38.00 |
| POROSITY | 42.77 | 26.60 | 31.99 | 24.00 |
| IFD 25% | 28.50 | 27.00 | 42.75 | 94.35 |
| IFD 65% | 68.25 | 63.25 | 90.75 | 269.25 |

TABLE IX

EXAMPLES OF MODIFICATIONS TO CROSSLINKING AGENT IN FOAM FORMULATIONS.

|  | EXAMPLE 49 | EXAMPLE 50 | EXAMPLE 51 |
|---|---|---|---|
| PP-D | 98.00 | | |
| PP-C | | 99.00 | |
| PP-V | | | 98.00 |
| POLYOL-F | 2.00 | | 2.00 |
| POLYOL-J | | 1.00 | |
| WATER | 3.75 | 3.75 | 3.75 |
| DEOA | 1.50 | 3.00 | 1.25 |
| MEOA | 1.00 | | |
| SUCROSE | | 2.00 | |
| EOA | | | 1.00 |
| C-183 | .15 | | .20 |
| A-1 | | .10 | |
| T-9 | .15 | | |
| D-19 | | .15 | |
| D-22 | | | .125 |
| SURF-B | .35 | | |

TABLE IX-continued
EXAMPLES OF MODIFICATIONS TO CROSSLINKING AGENT IN FOAM FORMULATIONS.

|  | EXAMPLE 49 | EXAMPLE 50 | EXAMPLE 51 |
|---|---|---|---|
| SURF-D |  | 1.00 |  |
| SURF-C |  |  | 1.00 |
| T-101 | 2.00 |  |  |
| DE60FSP |  | 1.00 | 1.00 |
| INDEX | 110.0 | 110.0 | 110.0 |
| CREM TIME | 7.00 | 10.00 | 8.00 |
| RISE TIME | 104.00 | 102.00 | 76.00 |
| % SETTLING | 2.95 | 2.02 | 3.69 |
| SHRINKAGE | V. SLIGHT | NIL | NIL |
| DENSITY | 1.63 | 1.65 | 1.55 |
| RESILIENCY | 50.00 | 54.00 | 57.00 |
| POROSITY | 34.68 | 37.38 | 21.21 |
| IFD 25% | 28.53 | 29.75 | 21.25 |
| IFD 65% | 65.75 | 73.25 | 48.50 |

TABLE X
PROCESSING AND PROPERTIES OF FOAM PRODUCED ON PILOT SCALE MACHINE.

|  | EXAMPLE 52 | EXAMPLE 53 | EXAMPLE 57 | EXAMPLE 58 | EXAMPLE 59 |
|---|---|---|---|---|---|
| PP-A | 100.00 |  |  |  |  |
| PP-W |  | 98.50 | 98.50 |  | 98.50 |
| PP-X |  |  |  | 98.50 |  |
| POLYOL-F |  | 1.50 | 1.50 | 1.50 | 1.50 |
| WATER | 3.75 | 3.75 | 5.00 | 4.50 | 1.90 |
| F-11C |  |  | 11.00 |  |  |
| DEOA | 1.25 | 3.00 | 3.00 | 3.00 | 3.00 |
| C-183 | .20 | .15 | .15 | .15 | .20 |
| T-9 | .125 | .125 | .15 | .10 |  |
| T-12 |  |  |  |  | .11 |
| SURF-A | 1.00 |  |  |  |  |
| SURF-B |  | .25 | .35 | .35 | .20 |
| T-101 | 2.00 | 2.00 | 2.00 | 2.00 | 1.00 |
| INDEX | 105.00 | 105.00 | 105.00 | 105.00 | 105.00 |
| CREM TIME | 6.00 | 5.00 | 5.00 | 5.00 | 5.00 |
| RISE TIME | 107.00 |  | 120.00 | 77.00 | 69.00 |
| % SETTLING | 5.80 | 3.11 | 1.82 | 4.82 | 6.08 |
| SHRINKAGE | NIL | NIL | NIL | NIL | NIL |
| DENSITY | 1.59 | 1.54 | 1.22 | 1.40 | 2.69 |
| RESILIENCY | 57.00 | 60.00 | 54.00 | 56.00 | 60.00 |
| POROSITY | 29.30 | 26.60 | 21.21 | 18.52 | 31.99 |
| IFD 25% | 15.05 | 16.17 | 18.90 | 22.88 | 19.90 |
| IFD 65% | 37.25 | 42.10 | 53.98 | 56.13 | 55.08 |

It is readily evident from the data set forth in the preceding tables that the use of the polymer polyol compositions of the present invention provide wider formulating and processing latitude in the preparation of polyurethane foams.

EXAMPLES 1-8; TABLE I.

These examples compare the DEOA latitude offered by a polymer polyol of this invention with two commercial HR polymer polyols in the bench scale production of 1.6 pcf water blown free-rise foams. The commercial polyols collapse at DEOA levels below about 0.8 php and exhibit unacceptable shrinkage at high levels (1.25 php in the case of PP-B). The preferred polymer polyol exhibits stable foam with low shrinkage from 0.6 php to 3 php DEOA.

EXAMPLES 9-14; TABLE II.

These examples demonstrate the improved stability at high water levels (4.5-5 php) for polymer polyols of the present invention relative to commercial polymer polyols.

EXAMPLES 15-20; TABLE III.

Loads (25% IFD) between 12 and 55 lbs/50 sq. in. and densities between 1.28 and 2.8 pcf are produced with the polymer polyols of this invention without load builders or physical blowing agents. Current production with HR slabstock polymer polyols ranges from about 20 to 35 lbs/50 sq. in. and density above about 1.8.

EXAMPLES 21-44; TABLES IV-VII.

These examples show modifications to the components of the polymer polyols of this invention and further demonstrate the breadth of the useful compositions.

EXAMPLES 45-51; TABLES VIII AND IX.

These examples also provide modification of the technology and further demonstrate the breadth of useful foam compositions.

EXAMPLES 52-59; TABLE X.

These examples demonstrate that the advantages obtained on the bench scale processing of the preceding examples, can be scaled up to maching foam processing.

Although the invention has been illustrated by the preceding examples, it is not to be construed as being limited to the materials employed therein, but rather, the invention relates to the generic area as a whole. Various modifications and embodiments thereof can be made without departing from the spirit or scope thereof.

What is claimed is:

1. A process for imparting enhanced processing latitude to flexible polyurethane foam formulations which method comprises incorporating in the formulation a polymer polyol which comprises:
   (1) a first polyol which is a high functionality polyalkylene oxide polyol or polyol blend with an equivalent weight between about 1000 and about 3000 having an ethylene oxide content between about 8% and about 25% wherein said polyol or polyol blend is present in an amount from about 30 to about 90 weight percent based on the total weight of the polymer polyol;
   (2) a second polyol which is a polyalkylene oxide polyol with a molecular weight between about 450 and about 30,000 and having a poly(oxyethylene) content greater than about 70% wherein said polyalkylene oxide polyol is present in an amount from about 1 to about 10 weight percent based on the total weight of the polymer polyol; and (3) a stably dispersed polymer formed by the in situ polymerization of ethylenically unsaturated monomers within component (1) and/or component (2); wherein said polymer is present in an amount from about 2 to about 50 weight percent based on the total weight of the polymer polyol, wherein the mixture of (1) and (2) has an average nominal functionality of about 3.0 or greater; and wherein the resulting polyurethane foam formulations yield polyurethane foams having a broader density range than polyurethane foams produced in the absence of the polymer polyol.

2. A process for imparting enhanced processing latitude to a high resilience, flexible polyurethane foam formulations which method comprises incorporating in the formulation a polymer polyol which comprises:

(1) a first polyol which is a high functionality polyalkylene oxide polyol or polyol blend with an equivalent weight between 1200 and about 3000 and having an ethylene oxide content between about 8 and about 25 percent; wherein said polyol or polyol blend is present in an amount from about 40 to about 90 weight percent based on the total weight of the polymer polyol;

(2) a second polyol which is a polyalkylene oxide polyol with a molecular weight between about 450 and about 30,000 and having an ethylene oxide content of at least about 70%; wherein said polyalkylene oxide polyol is present in an amount from about 1 to about 10 weight percent based on the total weight of the polymer polyol; and (3) a stably dispersed polymer formed by the in situ polymerization of ethylenically unsaturated monomers within component (1) and/or component (2); wherein said polymer is present in an amount from about 2 to about 50 weight percent based on the total weight of the polymer polyol; wherein the mixture of (1) and (2) has an average nominal functionality of about 3.2 to about 6; and wherein the resulting polyurethane foam formulations yield polyurethane foams having a broader density range than polyurethane foams produced in the absence of the polymer polyol.

3. The process of claim 2 wherein said polymer polyol is reacted in the presence of (a) water, (b) an organic isocyanate, (c) at least one low molecular weight crosslinking/extending agent, (d) foam stabilizer, and (e) at least one catalyst; and optionally foam additives.

4. The process of claim 3 wherein water is present in an amount between about 1.0 and 5.0 parts per hundred parts of polyol.

5. The process of claim 3 whrein water is present in an amount between about 1.5 and 4.0 parts per hundred parts of polyol.

6. The process of claim 3 wherein the crosslinking/extending agent is an alkanolamine.

7. The process of claim 3 wherein the crosslinking/extending agent is diethanolamine.

8. The process of claim 3 wherein the crosslinking/extending agent is present in an amount of between about 0.4 and 5 parts per hundred parts of polymer polyol.

9. A flexible polyurethane foam prepared by the process of claim 3.

10. An article of manufacture comprised in part of at least one foam of claim 9.

* * * * *